(12) United States Patent
Hulse et al.

(10) Patent No.: US 9,347,695 B2
(45) Date of Patent: *May 24, 2016

(54) TRANS-CHLORO-3,3,3-TRIFLUOROPROPENE FOR USE IN CHILLER APPLICATIONS

(71) Applicant: HONEYWELL INTERNATIONAL INC., Morristown, NJ (US)

(72) Inventors: Ryan Hulse, Getzville, NY (US); Rajiv R. Singh, Getzville, NY (US); Mark W. Spatz, East Amherst, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/071,140

(22) Filed: Nov. 4, 2013

(65) Prior Publication Data
US 2014/0069129 A1   Mar. 13, 2014

Related U.S. Application Data

(60) Division of application No. 12/637,562, filed on Dec. 14, 2009, now Pat. No. 8,574,451, and a continuation-in-part of application No. 12/351,807, filed on Jan. 9, 2009, said application No. 12/637,562 is a continuation-in-part of application No. 11/475,605, filed on Jun. 26, 2006, now Pat. No. 9,005,467.

(60) Provisional application No. 61/138,245, filed on Dec. 17, 2008, provisional application No. 61/020,390, filed on Jan. 10, 2008, provisional application No. 60/693,853, filed on Jun. 24, 2005.

(51) Int. Cl.
*C09K 5/04* (2006.01)
*F25B 1/10* (2006.01)

(52) U.S. Cl.
CPC .. *F25B 1/10* (2013.01); *C09K 5/044* (2013.01)

(58) Field of Classification Search
CPC ........................ C09K 5/045; C09K 2205/126
USPC ...................................... 252/67, 68
See application file for complete search history.

(56) References Cited

U.S. PATENT DOCUMENTS

| | | | |
|---|---|---|---|
| 7,442,321 B1 * | 10/2008 | Chen et al. | 252/68 |
| 7,833,433 B2 * | 11/2010 | Singh et al. | 252/67 |
| 8,574,451 B2 * | 11/2013 | Hulse et al. | 252/67 |
| 8,703,690 B2 * | 4/2014 | Van Horn et al. | 510/408 |
| 2005/0020862 A1 * | 1/2005 | Tung et al. | 570/164 |
| 2005/0090698 A1 * | 4/2005 | Merkel et al. | 570/155 |
| 2007/0007488 A1 * | 1/2007 | Singh et al. | 252/68 |
| 2007/0010592 A1 * | 1/2007 | Bowman et al. | 521/131 |
| 2009/0253820 A1 * | 10/2009 | Bowman et al. | 521/170 |

* cited by examiner

*Primary Examiner* — John Hardee
(74) *Attorney, Agent, or Firm* — Colleen D. Szuch

(57) ABSTRACT

The present invention relates to refrigerant compositions containing trans-chloro-3,3,3-trifluoropropene (1233zd(E)) useful for chiller applications and processes using 1233zd(E).

37 Claims, No Drawings

TRANS-CHLORO-3,3,3-TRIFLUOROPROPENE FOR USE IN CHILLER APPLICATIONS

CROSS REFERENCE TO RELATED APPLICATIONS

This application of a division of Ser. No. 12/637,562, filed Dec. 14, 2009 (now U.S. Pat. No. 8,574,451), which is a continuation-in-part of Ser. No. 12/351,807, filed Jan. 9, 2009, which claims the priority benefit of U.S. Provisional Application No. 61/138,245, filed Dec. 17, 2008, and U.S. Provisional Application No. 61/020,390, filed Jan. 10, 2008. This application is also a continuation-in-part of Ser. No. 11/475,605, filed Jun. 26, 2006 (now U.S. Pat. No. 9,005,467) which claims the priority benefit of U.S. Provisional Application No. 60/693,853, filed Jun. 24, 2005. Each of the above-identified applications are incorporated herein by reference.

FIELD OF THE INVENTION

The present invention relates to compositions having utility in numerous applications, including chiller applications, and to methods and systems utilizing such compositions. In particular, the present invention is directed to methods of using refrigerant compositions containing trans-chloro-3,3,3-trifluoropropene (1233zd(E)) in chiller applications.

BACKGROUND OF THE INVENTION

Fluorocarbon-based fluids are widely used in refrigeration, heat pump, air conditioning, and chiller applications. Fluorocarbons are used to transfer heat from an undesired location to a location where the heat is wanted. A purpose of refrigeration or air conditioning systems is to remove energy from a cool region. A purpose of a heat pump is to add energy to a hot region.

Physical properties of the refrigerant such as density, vapor pressure, and heat of vaporization help to determine what application is best for the refrigerant. Safety and environmental impacts of the refrigerant should also be considered. For example, the flammability, ozone depletion potential (ODP), and global warming potential (GWP) should be considered.

Mixtures of refrigerants are commonly used to match the desired physical properties of the refrigeration or heat pump system. Centrifugal chillers, however, can only accommodate pure or azeotropic refrigerants since non-azeotropic mixtures will separate in pool boiling evaporators decreasing the system performance.

An important factor to consider for a new refrigerant for use in a chiller is the COP (the ratio between the cooling capacity in KW to the energy consumed by the whole chiller in KW). The COP allows effective comparison of different refrigerants in a chiller system. The higher the COP, the more efficient the system is to convert energy into the desired cooling.

BRIEF SUMMARY OF THE INVENTION

Aspects of the present invention are directed to compositions having utility in chiller systems, and to methods and systems utilizing such compositions.

The invention provides compositions containing at least trans1-chloro-3,3,3-trifluoropropene (1233zd(E)). Compositions containing the compound 1233zd(E) are environmentally suitable replacements for chlorofluorocarbons in refrigeration applications such as chillers.

DETAILED DESCRIPTION OF THE INVENTION

It was discovered that 1233zd(E) (trans1-chloro-3,3,3-trifluoropropene) is particularly useful as a refrigerant in chiller applications. Due to the extremely short atmospheric lifetime of the 1233zd(E), the ozone depletion potential and the global warming potential of these molecules is significantly smaller than that of currently used refrigerant R-123. Further it was discovered that of the low ODP molecules currently available, 1233zd(E) has the highest COP of all the compounds that are not scheduled for phase-out in the Montreal Protocol.

It was discovered that the refrigerant 1233zd(E) performed better than the cis-isomer 1233zd(Z) in chiller applications. 1233zd(E) has a much higher capacity therefore a smaller system could be used to deliver the same capacity as either a 1233zd(Z) or R123 systems. The COP of 1233zd(E) is slightly lower than 1233zd(Z) and on par with R123.

The composition useful in the present invention comprises trans-1-chloro-3,3,3-trifluoropropene (HCFC-1233zd(E)). Although it is contemplated that the compositions of the present invention may include 1233zd(E) in widely ranging amounts, generally the refrigerant compositions of the present invention comprise 1233zd(E), in an amount that is at least about 50% by weight, and more particularly at least about 70% by weight, of the total composition. In many embodiments, the heat transfer compositions of the present invention comprise 100% 1233zd(E).

The 1233zd(E) used in the present invention should be used in sufficiently high purity so as to avoid the introduction of adverse influences upon the cooling or heating properties of the system.

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition. Furthermore, the present compositions may also include a compatibilizer, such as propane and pentane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Nitromethane may also be added as a stabilizer.

Many existing refrigeration systems are currently adapted for use in connection with existing refrigerants, and the compositions of the present invention are believed to be adaptable for use in many of such systems, either with or without system modification. In many applications the compositions of the present invention may provide an advantage as a replacement in systems, which are currently based on refrigerants having a relatively high capacity. Furthermore, in embodiments where it is desired to use a lower capacity refrigerant composition of the present invention, for reasons of cost for example, to replace a refrigerant of higher capacity, such embodiments of the present compositions provide a potential advantage. Thus, it is preferred in certain embodiments to use compositions of the present invention, particularly compositions comprising a substantial proportion of, and in some embodiments consisting essentially of 1233zd(E), as a replacement for existing refrigerants, such as R-11 and R-123. In certain applications, the refrigerants of the present invention potentially permit the beneficial use of larger displacement compressors, thereby resulting in better energy efficiency than other refrigerants, such as R-134a. Therefore the refrigerant compositions comprising 1233zd(E), provide the possibility of achieving a competitive advantage on an energy basis for refrigerant replacement applications.

It is contemplated that the compositions comprising 1233zd(E) also have advantage (either in original systems or when used as a replacement for refrigerants such as R-12 and R-500), in chillers typically used in connection with commercial air conditioning systems.

There is no need for a flammability suppressant since 1233zd(E) is nonflammable. Moreover, 1233zd(E) could be added as a flammability suppressant to chillers that use flammable refrigerants.

The present methods, systems and compositions are thus adaptable for use in connection with automotive air conditioning systems and devices, commercial refrigeration systems and devices, chillers, residential refrigerator and freezers, general air conditioning systems, heat pumps, and the like.

Thus, the compositions are used in numerous methods and systems, including in heat transfer fluids in methods and systems for transferring heat, such as refrigerants used in refrigeration, air conditioning and heat pump systems.

For example, the heat transfer methods generally comprise providing a composition of the present invention and causing heat to be transferred to or from the composition changing the phase of the composition. For example, the present methods provide cooling by absorbing heat from a fluid or article, preferably by evaporating the present refrigerant composition in the vicinity of the body or fluid to be cooled to produce vapor comprising the present composition. Preferably the methods include the further step of compressing the refrigerant vapor, usually with a compressor or similar equipment to produce vapor of the present composition at a relatively elevated pressure. Generally, the step of compressing the vapor results in the addition of heat to the vapor, causing an increase in the temperature of the relatively high-pressure vapor. Preferably, the present methods include removing from this relatively high temperature, high pressure vapor at least a portion of the heat added by the evaporation and compression steps. The heat removal step preferably includes condensing the high temperature, high-pressure vapor while the vapor is in a relatively high-pressure condition to produce a relatively high-pressure liquid comprising a composition of the present invention. This relatively high-pressure liquid preferably then undergoes a nominally isoenthalpic reduction in pressure to produce a relatively low temperature, low-pressure liquid. In such embodiments, it is this reduced temperature refrigerant liquid which is then vaporized by heat transferred from the body or fluid to be cooled.

In another process embodiment of the invention, the compositions of the invention may be used in a method for producing heating which comprises condensing a refrigerant comprising the compositions in the vicinity of a liquid or body to be heated. Such methods, as mentioned hereinbefore, frequently are reverse cycles to the refrigeration cycle described above.

For purposes of the invention, by centrifugal chillers is meant refrigeration equipment that uses centrifugal compression to convert the refrigerant gas from low to high pressure. Compression may be performed in a single stage or multiple stages. Preferably the multi-stage operation of the process comprises from about two to about five, more preferably about two to about four and most preferably about two to about three stages of compression. The precise number of stages is application dependent and can be determined without undue experimentation.

The 1233zd(E) compositions of the invention may be used in a method for producing refrigeration that comprises condensing a refrigerant and thereafter evaporating the refrigerant in the vicinity of a body to be cooled. Alternatively, the 1233zd(E) compositions of the invention may be used in a method for producing heating which comprises condensing a refrigerant in the vicinity of a body to be heated and thereafter evaporating the refrigerant.

In yet another embodiment, the 1233zd(E) compositions of the invention may be used in a method for producing refrigeration using a centrifugal chiller that comprises compressing the compound or mixture of the invention by centrifugal compression and evaporating the refrigerant in the vicinity of a body to be cooled.

The following examples are provided for the purpose of illustrating the present invention but without limiting the scope thereof.

Example 1

The vapor pressure of 1233zd(E) was measured by means of a MKS heated pressure transducer.

| Temp, C. | VP, psia |
|---|---|
| −10.06 | 4.33 |
| −0.05 | 6.9 |
| 9.93 | 10.55 |
| 19.93 | 15.45 |
| 29.86 | 22.06 |
| 39.78 | 20.47 |
| 49.85 | 40.92 |
| 59.78 | 55.5 |
| 69.77 | 72.85 |
| 79.69 | 93.02 |

The liquid density of 1233zd(E) was measured using a vibrating tube densitometer.

| Temp, C. | Den, kg/m$^3$ |
|---|---|
| −17.49 | 1360.3 |
| −29.45 | 1383.98 |
| −29.81 | 1384.70 |
| −25.08 | 1371.38 |
| −22.03 | 1367.40 |
| −19.59 | 1362.51 |
| −9.79 | 1341.34 |
| −1.99 | 1323.65 |
| 0.02 | 1319.65 |
| 10.11 | 1296.48 |
| 17.01 | 1280.22 |
| 18.83 | 1276.01 |
| 20.06 | 1276.37 |

Example 2

The fluid of choice for centrifugal chillers is 2,2-dichloro-1,1,1-trifluoroethane (R123). Due to the ozone depletion potential of R123 it is currently banned under the Montreal protocol. It is important to maintain the high coefficient of performance (COP) when finding a replacement fluid for R123. A single stage chiller consists if a compressor which pressurizes a low pressure gas and delivers it to the evaporator. The high pressure fluid is then condensed at a relatively high temperature, for this case the condenser is maintained at 40° C. The condensed fluid is then passed through an expansion device which lowers both the temperature and pressure of the fluid and is introduced into the evaporator; in this case the evaporator is maintained at 2° C. The cold low pressure gas is then used to transfer heat away from the body which requires cooling by evaporating the fluid in the evaporator. The thermodynamic performance of a refrigerant can be calculated using standard refrigerant cycle analysis techniques outlined in thermodynamic texts such as R. C. Downing, Fluorocarbon Refrigerants Handbook, Chapter 3, Prentice-Hall. 1988. The COP of a single compressor chiller was determined at a condenser temperature of 2° C., evaporator temperature of 40° C., and a compressor efficiency of 0.75. The COPs of R123, 1233zd(Z) and 1233zd(E) in a single compressor system are given in the following table. This example demonstrates that the COP of R123 can be maintained when using 1233zd(E) and 1233zd(Z). Surprisingly it has also been shown that for the same sized system 1233zd(E) has a much higher capacity that R123.

Single Compressor

| Fluid | Cap kJ/m$^3$ | COP |
|---|---|---|
| R123 | 346.9 | 4.75 |
| 1233zd(E) | 471.8 | 4.73 |
| 1233zd(Z) | 223.1 | 4.82 |

Example 3

In order the raise the efficiency of a chiller a common practice is to use multiple compressors with an internal heat exchanger. This system is very similar to the one described in example 1 with the exception that a portion of the fluid exiting the condenser is used to cool the stream exiting the compressor at an intermediate pressure. The recombined stream is then compressed to the desired high pressure and introduced into the condenser. The thermodynamic performance of a refrigerant can be calculated using standard refrigerant cycle analysis techniques outlined in thermodynamic texts such as R. C. Downing, Fluorocarbon Refrigerants Handbook, Chapter 3, Prentice-Hall, 1988. The COP of a double compressor chiller was determined at a condenser temperature of 2° C., evaporator temperature of 40° C., both compressors had an efficiency of 0.75, and a 5° C. approach temperature out of the heat exchanger. The COPs of R123, 1233zd(Z) and 1233zd (E) in a double compressor system are given in the following table. Surprisingly it has also been shown that for the same sized system 1233zd(E) has a much higher capacity that R123.

Double Compressor

| Fluid | Cap kJ/m$^3$ | COP |
|---|---|---|
| R123 | 385.1 | 4.96 |
| 1233zd(E) | 525.1 | 4.94 |
| 1233zd(Z) | 245.1 | 5.00 |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for producing refrigeration comprising compressing a refrigerant composition comprising trans1-chloro-3,3,3-trifluoropropene (1233zd(E)), wherein said compressing occurs within a multiple stage centrifugal chiller system.

2. The method of claim 1 wherein the compressing step comprises from about two to about five stages of compression.

3. The method of claim 1 wherein the refrigerant composition comprises at least 50 wt % 1233zd(E) based on total weight of the composition.

4. The method of claim 1 wherein the refrigerant composition comprises at least 70 wt % 1233zd(E) based on total weight of the composition.

5. The method of claim 1 wherein said refrigerant composition comprises a hydrofluoroolefin consisting essentially of 1233zd, wherein a majority of said 1233zd is 1233zd(E).

6. The method of claim 5 wherein said 1233zd(E) and 1233zd(Z) are in a ratio of about 2:1 to about 99:1.

7. The method of claim 6 wherein said ratio is about 4:1 to about 19:1.

8. The method of claim 1 wherein said refrigerant consists essentially of 1233zd(E).

9. The method of claim 1 wherein said chiller system comprises a heat transfer composition comprising said refrigerant and at least one lubricant.

10. The method of claim 9 wherein said heat transfer composition comprises form about 30 to about 50 percent by weight of said lubricant.

11. The method of claim 10 wherein said chiller system is included in a commercial air conditioning system.

12. The method of claim 10 wherein said chiller system has from about two to about five stages.

13. The method of claim 10 wherein said chiller system has from about two to about three stages.

14. The method of claim 9 wherein said lubricant is selected from polyol esters (POEs), poly alkylene glycols (PAGs), silicone oil, mineral oil, alkyl benzenes (ABs), poly (alpha-olefin) (PAO) and combinations of these.

15. The method of claim 9 wherein said lubricant comprises mineral oil.

16. The method of claim 9 wherein said refrigerant is a nonflammable.

17. The method of claim 9 wherein said chiller system is included in a commercial air conditioning system.

18. The method of claim 1 wherein said chiller system has from about two to about five stages.

19. The method of claim 1 wherein said chiller system has from about two to about three stages.

20. A centrifugal chiller system comprising:
 a. a multistage centrifugal compressor; and
 b. a refrigerant comprising trans1-chloro-3,3,3-trifluoropropene (1233zd(E)), wherein said refrigerant is disposed within said centrifugal compressor.

21. The centrifugal chiller system of claim 20 wherein the refrigerant composition comprises at least 50 wt % 1233zd (E) based on total weight of the composition.

22. The centrifugal chiller system of claim 20 wherein the refrigerant composition comprises at least 70 wt % 1233zd (E) based on total weight of the composition.

23. The centrifugal chiller system of claim 20 wherein said refrigerant composition further comprises 1233zd(Z).

24. The centrifugal chiller system of claim 23 wherein said 1233zd(E) and 1233zd(Z) are in a ratio of about 2:1 to about 99:1.

25. The centrifugal chiller system of claim 24 wherein said ratio is about 4:1 to about 19:1.

26. The centrifugal chiller system of claim 20 wherein said refrigerant consists essentially of 1233zd(E).

27. The centrifugal chiller system of claim 20 wherein said chiller system comprises a heat transfer composition comprising said refrigerant and at least one lubricant.

28. The centrifugal chiller system of claim 27 wherein said heat transfer composition comprises form about 30 to about 50 percent by weight of said lubricant.

29. The centrifugal chiller system of claim 27 wherein said lubricant is selected from polyol esters (POEs), poly alkylene gycols (PAGs), silicone oil, mineral oil, alkyl benzenes (ABs), poly(alpha-olefin) (PAO) and combinations of these.

30. The centrifugal chiller system of claim 27 wherein said lubricant comprises mineral oil.

31. A commercial air conditioning system comprising the centrifugal chiller system of claim 30.

32. The centrifugal chiller system of claim 27 wherein said refrigerant is a nonflammable.

33. The centrifugal chiller system of claim 27 wherein said chiller system has from about two to about five stages.

34. The centrifugal chiller system of claim 27 wherein said chiller system has from about two to about three stages.

35. A commercial air conditioning system comprising the centrifugal chiller system of claim 20.

36. The centrifugal chiller system of claim 20 wherein said chiller system has from about two to about five stages.

37. The centrifugal chiller system of claim 20 wherein said chiller system has from about two to about three stages.

* * * * *